April 24, 1928.
S. A. CHAPIN
MARINE PROTRACTOR
Filed July 6, 1926
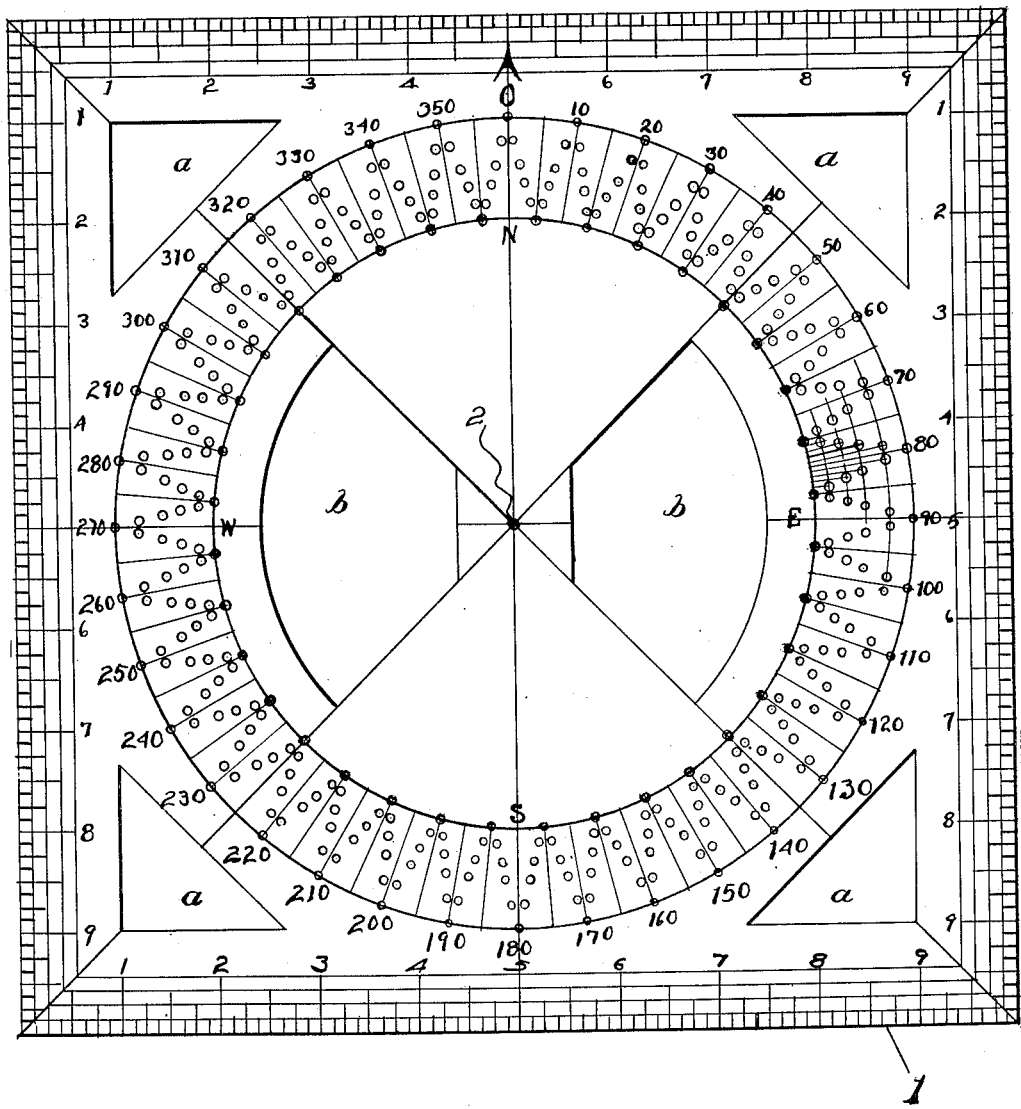
INVENTOR.
Samuel A. Chapin.
BY
Carlos P. Griffin
ATTORNEY.

Patented Apr. 24, 1928.

1,667,191

UNITED STATES PATENT OFFICE.

SAMUEL A. CHAPIN, OF SEATTLE, WASHINGTON.

MARINE PROTRACTOR.

Application filed July 6, 1926. Serial No. 120,850.

This invention relates to certain improvements in marine map protractors commonly used for plotting angles, in plotting positions, and in laying off courses on marine charts and plotting sheets, although the protractor may also be used in connection with ordinary mechanical drawing, surveying and map making.

These objects are attained by the novel design and construction of the protractor which enables the operator to transfer the protractor center from one part of the work to another part with accuracy, and thereby making it possible to set off from any point of departure the desired angle.

It will be understood by those skilled in the art that on the ordinary marine chart, or plotting sheet there are lines indicating the latitude and longitude of given places, but of course, the ship is always at a distance from these lines, and in order to transfer the compass rose from one point of the sheet to another, it is necessary to have the sheet fastened to a board and then make use of a parallel ruler or T square, but with the present invention all that is necessary is to place the protractor upon the chart with its outward graduations properly positioned with respect to the latitude and longitude lines shifting the protractor until its center is over the desired place of departure whereupon the given angle of departure may be instantly marked upon the chart.

It will also be understood by those skilled in the art that upon all ordinary working maps or charts that the scale of the latitude and longitude lines is such that said lines are always at right angles to each other, substantially all marine working sheets being on the Mercatoro projection of which this is true.

This protractor consists of a substantially transparent sheet provided with a 360 degree centrally placed protractor scale, said sheet having a series of holes arranged therein with one hole for every degree and with a center hole.

The protractor scale is printed in the exact center of a perfect square, on each edge of which square there is a graduated scale usually ten inches divided in 8ths or 10ths, the sides of the square are marked "north, west, east and south" to correspond with the graduations of the protractor scale.

Other objects of the invention will appear as the description proceeds.

An embodiment of the invention is shown in the accompanying drawings in which the same reference numeral is applied to the same portion throughout, but I am aware that there may be modifications thereof.

The figure is a plan view of the protractor complete.

The protractor consists of a transparent or substantially transparent sheet of celluloid designated at 1. This sheet has a scale divided into 8ths or some other small division along each edge, and it has a hole at the exact center as indicated at 2 around which the 360 degree scale 3 is placed, said protractor scale is arranged with its north point at the midpoint of one side of the square and then a series of holes placed in zig-zag lines are formed through the celluloid or other material of which the scale is constructed, so that there is a pencil hole for every degree of the scale.

The operation of the protractor is as follows: Assuming the working chart to show a latitude and longitude line or only a portion of each, and assuming the officer has worked out his position from other readings he marks his position upon the chart which may be at a distance of several inches from any latitude or longitude line, he then picks up the protractor places its center over his point of departure and turns the protractor until the graduations at the edge of the square bear the same relation to each other and to the latitude and longitude lines as is borne by the protractor when it is placed over the printed compass rose on the chart with respect to the same lines. That is to say, that if the compass rose is printed so that its position is close to the latitude and longitude lines it may be that one reading on the outside of the scale will be one inch and the other two inches to bring the north and south lines of the protractor in alignment with the north and south line of the compass rose, whereas the point of departure may be considerable distance away, and to transfer the compass rose to the point of departure will necessitate a reading of five inches of both sides of the square on the latitude line, and three inches on the other two sides of the square on the longitude line of the map. This will bring the protractor to the same position the rose printed on the map occupies, and the officer can then set off on the protractor any departure with an accuracy of one degree by marking through one of the holes at the outer edge of the compass rose on the protractor. It will thus be seen that a true compass rose may be transferred from one place to another over the chart by reading corresponding graduations on opposite sides of the square to correspond with meridians of longitude and parallels of latitude so that any angle may be rapidly visualized and set off at any time.

A solid sheet of celluloid has a tendency to warp, but I have found that this may be overcome by cutting away portions of the sheet. The blank spaces may be cut away in any suitable geometrical designs. I have indicated cut-away portions at *a* and *b*.

Having thus described my invention, what I desire to secure by Letters Patent of the United States, is as follows, but modifications may be made in carrying out the invention shown in the drawing and in the above particularly described form thereof, within the purview of the annexed claim.

I claim:

A protractor of the class described comprising a square sheet of substantially transparent material having a hole in the center of said sheet, an inner circle marked on said sheet, an outer circle spaced from and concentric with said inner circle, radial lines from one circle to the other indicating the degrees by fives, perforations on said alternate lines at the outer circle, perforations on the remaining lines at the inner circle, and perforations in line from the inner to the outer perforations to indicate divisions of one degree each.

In testimony whereof I have hereunto set my hand this 25" day of May, A. D. 1926.

SAMUEL A. CHAPIN.